United States Patent
Downer et al.

(10) Patent No.: US 7,716,461 B2
(45) Date of Patent: *May 11, 2010

(54) CAPTURING AND RESTORING APPLICATION STATE AFTER UNEXPECTED APPLICATION SHUTDOWN

(75) Inventors: Joel Downer, Woodinville, WA (US); Aleita Downer, legal representative, Spring Valley, CA (US); Shaheeda Parveen Nizar, Redmond, WA (US); Chaitanya Dev Sareen, Seattle, WA (US); Jixin Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

This patent is subject to a terminal disclaimer.

(21) Appl. No.: 11/507,648

(22) Filed: Aug. 21, 2006

(65) Prior Publication Data

US 2007/0162785 A1 Jul. 12, 2007

Related U.S. Application Data

(63) Continuation of application No. 11/331,405, filed on Jan. 12, 2006, now Pat. No. 7,574,591.

(51) Int. Cl.
*G06F 9/24* (2006.01)
*G06F 11/30* (2006.01)

(52) U.S. Cl. .................. 713/1; 713/340; 714/1; 714/2; 714/15

(58) Field of Classification Search .......... 713/1, 713/340; 714/1, 2, 15
See application file for complete search history.

(56) References Cited

U.S. PATENT DOCUMENTS

| | | | |
|---|---|---|---|
| 4,827,447 A * | 5/1989 | Croes et al. .................. 715/219 |
| 5,317,752 A | 5/1994 | Jewett et al. |
| 5,712,971 A | 1/1998 | Stanfill |
| 5,748,882 A | 5/1998 | Huang .......................... 714/47 |
| 5,996,073 A | 11/1999 | Lee et al. ........................ 713/1 |
| 6,009,258 A | 12/1999 | Elliott .......................... 703/22 |

(Continued)

FOREIGN PATENT DOCUMENTS

KR 10-2000-0063253 A 11/2000

(Continued)

OTHER PUBLICATIONS

Candea, George et al., "Recovery-Oriented Computing: Building Multitier Dependability", IEEE Computer Society, Nov. 2004, pp. 60-67.

(Continued)

*Primary Examiner*—Thomas Lee
*Assistant Examiner*—Vincent T Tran
(74) *Attorney, Agent, or Firm*—Merchant & Gould P.C.

(57) ABSTRACT

During unexpected application shutdowns, application settings states are captured, and displayed application states are restored upon subsequent application restart. User data displayed prior to shutdown may also be restored to pre-shutdown states. Data representing in-use application settings states and in-use user data are stored on a periodic basis, or upon notification of an impending application shutdown. Upon restart, any application deployed prior to shutdown is re-deployed according to the stored application settings states for each application, and any in-use documents or other data may be re-deployed according to the stored user data.

20 Claims, 3 Drawing Sheets

U.S. PATENT DOCUMENTS

| | | | |
|---|---|---|---|
| 6,018,805 | A | 1/2000 | Ma et al. .................. 714/4 |
| 6,122,752 | A | 9/2000 | Farah ..................... 714/2 |
| 6,151,569 | A | 11/2000 | Elliott .................... 703/22 |
| 6,199,179 | B1 | 3/2001 | Kauffman et al. .......... 714/26 |
| 6,336,161 | B1* | 1/2002 | Watts .................... 711/103 |
| 6,393,584 | B1* | 5/2002 | McLaren et al. .......... 714/14 |
| 6,490,594 | B1 | 12/2002 | Lomet .................... 702/200 |
| 6,662,310 | B2 | 12/2003 | Lopez et al. ............. 714/15 |
| 6,785,783 | B2* | 8/2004 | Buckland ................. 711/153 |
| 6,968,469 | B1* | 11/2005 | Fleischmann et al. ...... 713/324 |
| 2003/0051186 | A1 | 3/2003 | Boudnik et al. ............ 714/2 |
| 2003/0208593 | A1 | 11/2003 | Bharati et al. ............ 709/224 |
| 2003/0236826 | A1* | 12/2003 | Islam et al. .............. 709/203 |
| 2004/0083405 | A1* | 4/2004 | Chang et al. ............. 714/24 |
| 2004/0153973 | A1* | 8/2004 | Horwitz ................... 715/530 |
| 2005/0009510 | A1* | 1/2005 | Tsuda et al. ............. 455/418 |
| 2005/0038933 | A1 | 2/2005 | Himmel et al. |
| 2005/0102396 | A1 | 5/2005 | Hipp ....................... 709/224 |
| 2005/0268301 | A1 | 12/2005 | Kelley |
| 2006/0139069 | A1* | 6/2006 | Frank et al. .............. 327/143 |

FOREIGN PATENT DOCUMENTS

| | | |
|---|---|---|
| KR | 10-2002-0026814 A | 4/2002 |
| WO | WO 96/07964 A1 | 3/1996 |

OTHER PUBLICATIONS

Guy, Ashley, "The Edition Editing Experience", http://www.abcdv.com/article/articleview/180/4/27/, Oct. 2003, 7 pp.

Laadan, Oren et al., "Transparent Checkpoint-Restart of Distributed Applications on Commodity Clusters", Proceedings of the 2005 IEEE International Conference on Cluster Computing, Boston MA, Sep. 26-30, 2005, 13 pp.

Evers, Joris, "Windows Vista to 'freeze dry' PCs before patching", CNET News.com, http://news.com.com/Windows+Vista+to+freeze+dry+PCs+before+patching/2100-7355_3-5846234.html?part=rss&tag=5846234&subj=news, Sep. 2, 2005, 5 pp.

"C5 1.0 Features and Architecture Overview: C5 Operating System Features", http://www.jaluna.com/doc/c5/html/Overview/x5098.html, printed Dec. 7, 2005, 6 pp.

Extended European Search Report mailed Mar. 6, 2009 including corrected Written Opinion from European Application No. 07709581.8 -1243.

Knop, F. et al., "Failure-Resilient Computations in the EcliPSe System," *1994 International Conference on Parallel Processing*, pp. III-184-III-187 (1994).

Office Action cited in U.S. Appl. No. 11/331,405 mailed May 21, 2008.

Office Action cited in U.S. Appl. No. 11/331,405 mailed Nov. 21, 2008.

Notice of Allowance cited in U.S. Appl. No. 11/331,405 mailed Apr. 30, 2009.

* cited by examiner

CAPTURING AND RESTORING APPLICATION STATE AFTER UNEXPECTED APPLICATION SHUTDOWN

RELATED APPLICATION

The present application is a continuation of U.S. application Ser. No. 11/331,405, filed on Jan. 12, 2006, and entitled CAPTURING AND RESTORING APPLICATION STATE AFTER UNEXPECTED APPLICATION SHUTDOWN.

BACKGROUND

Computer and software users have grown accustomed to performing a variety of tasks using a number of different software applications. Letters, memoranda and other documents are prepared using word processing applications. Presentations and drawings are prepared using slide presentation applications. Financial reports and other data manipulation are prepared and performed using spreadsheet applications. Electronic mail, calendar information, tasks and notes are entered, exchanged and maintained using electronic mail and calendar applications, and a variety of other tasks are performed with other applications.

At any given time, a typical software user may have multiple applications and multiple documents in use, where each application user interface and each launched document is displayed in one or more display frames on the user's computer display screen. In such cases, deployed applications and associated documents are in a given state at any given time. For example, a deployed word processing application may be displaying page 4 of a memorandum. At the same time, a user's electronic mail application may be deployed showing the user's contacts information. A spreadsheet document may be deployed, and the fifth sheet of data may be displayed showing data the user is reviewing while preparing the memorandum currently displayed by her word processing application.

Unfortunately, computers and software applications are often unexpectedly shut down for a variety of reasons. A power outage may cause a computer and any applications presently in use to shut down. An operating system or software application may "crash" where some aspect of data being processed or some aspect of processing sequencing in the operating system or application becomes problematic and causes the operating system or application to shut down. On the other hand, often a computer or software application shutdown is intentional, but still unexpected to the user. For example, while the user is away from her computer, a computer system administrator at her organization may load a software patch (update or other software modification) to one or more applications she is currently using, followed by a restart of her computer for properly integrating the patch with the subject application.

Such intended or unintended shutdowns and restarts often cause a loss of data being entered or edited by a user at the time of the shutdown, and moreover, such shutdowns and restarts often result in a loss of the current application state of the various applications in use at the time of the shutdown and subsequent restart. That is, the number of applications deployed, the locations on the display screen of the various application display frames, the deployment of particular documents or other data, the editing locations in deployed documents, and other application settings states are lost. After the shutdown and subsequent restart, the user must redeploy each application and associated document or other data, reposition and resize the application display frames for each deployed application, and redeploy each document or other data in use to a position in the document or data at which the document or data was being edited prior to the shutdown.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing for capturing and restoring application settings states during application shutdowns and subsequent restarts. Pre-shutdown deployed user data also may be captured for redeployment after subsequent application restart. According to an embodiment of the invention, an in-use application periodically saves data representing its current state. For example, data representing the size and location of deployed application user interface components and display frames, the location of scrollbars and other displayed application components, and data representing presently displayed documents and the viewing and editing positions of presently displayed documents are stored to memory on a periodic basis.

In addition to storing application state data, user data, for example, data being presently entered or edited in an in-use document or data, is stored to memory on a periodic basis. According to one embodiment, a draft data storage mechanism is provided for storing user data such as draft calendar data being entered or edited during an electronic calendar application session.

Both application state data and user data may be automatically stored at regular intervals, for example, every 10 minutes, or alternatively, application state data and user data may be stored automatically upon the detection of an impending application shutdown. According to one embodiment of the invention, if a planned application shutdown is scheduled, a restart manager module notifies any in-use application to automatically save application state data and any user data.

When an application is restarted after an intended or unintended shutdown, the application is redeployed to the application state stored for the application prior to shutdown. And, any documents or other user data that were in use at the time of application shutdown are automatically redeployed and displayed according to the last stored state for the documents or other data prior to application shutdown.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to capturing and restoring application state and user data during unexpected application shutdowns and subsequent restarts. Data representing in-use application settings state and in-use user data are stored on a periodic basis, or upon notification of an impending application shutdown. Upon restart, any application deployed prior to shutdown is re-deployed according to the stored application settings state for each application and any in-use documents or other data are re-deployed according to the stored user data. According to embodiments of the present invention, storage and restoration of application settings state and storage and restoration of user data may be performed separately. That is, both pre-shutdown application state and user data may be captured and restored, or alternatively, only application state may be captured and restored automatically upon restart, and any pre-shutdown user data may be re-deployed manually or automatically based on a separate storage of that user data.

In the following detailed description, references are made to the accompanying drawings that form a part hereof and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
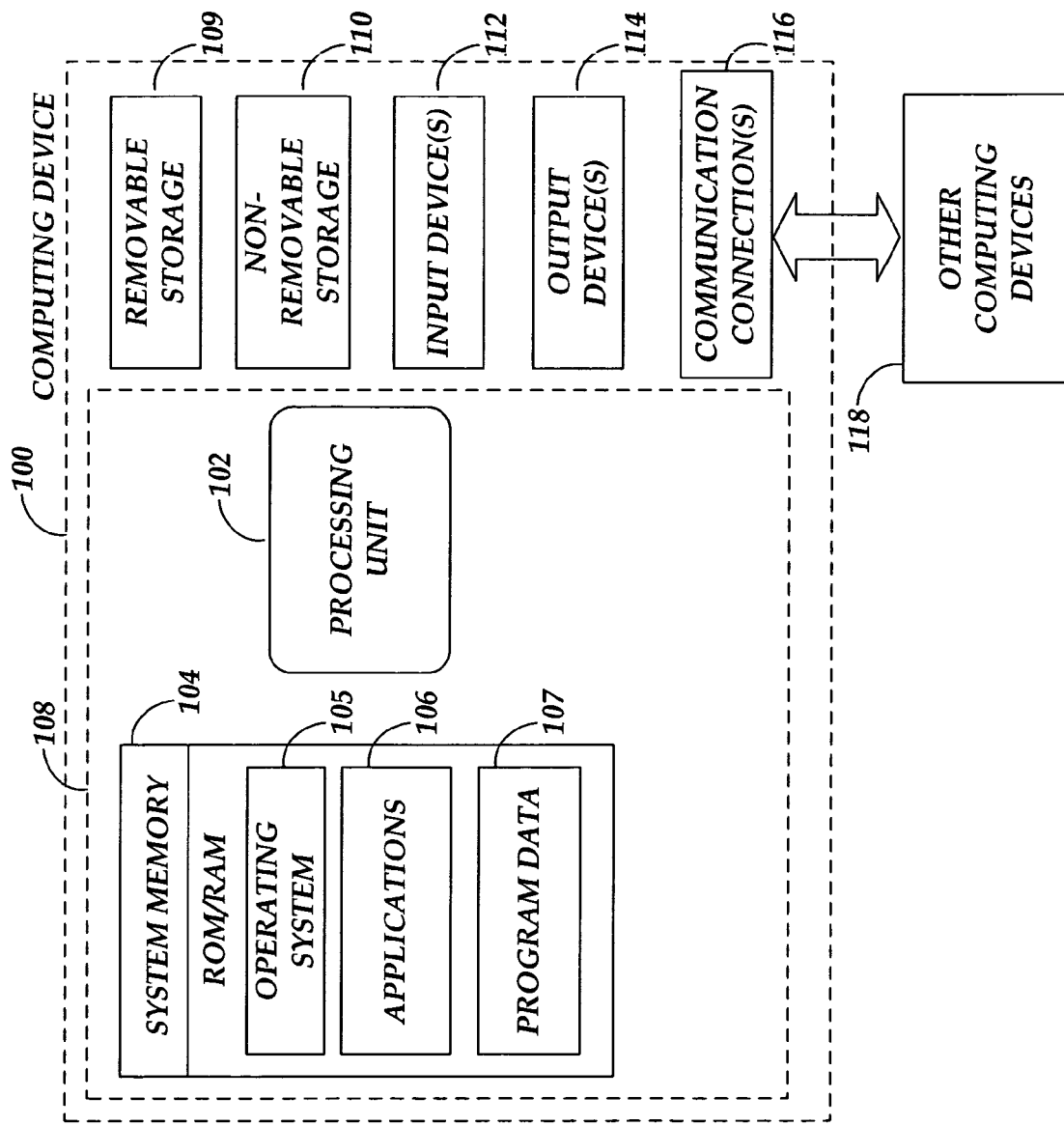
FIG. 1 illustrates an exemplary computing operating environment.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as an electronic mail program, a calendar program, an Internet browsing program, and the like. An example of such programs is OUTLOOK® manufactured by MICROSOFT CORPORATION. The application 106 may include a number of other types of software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
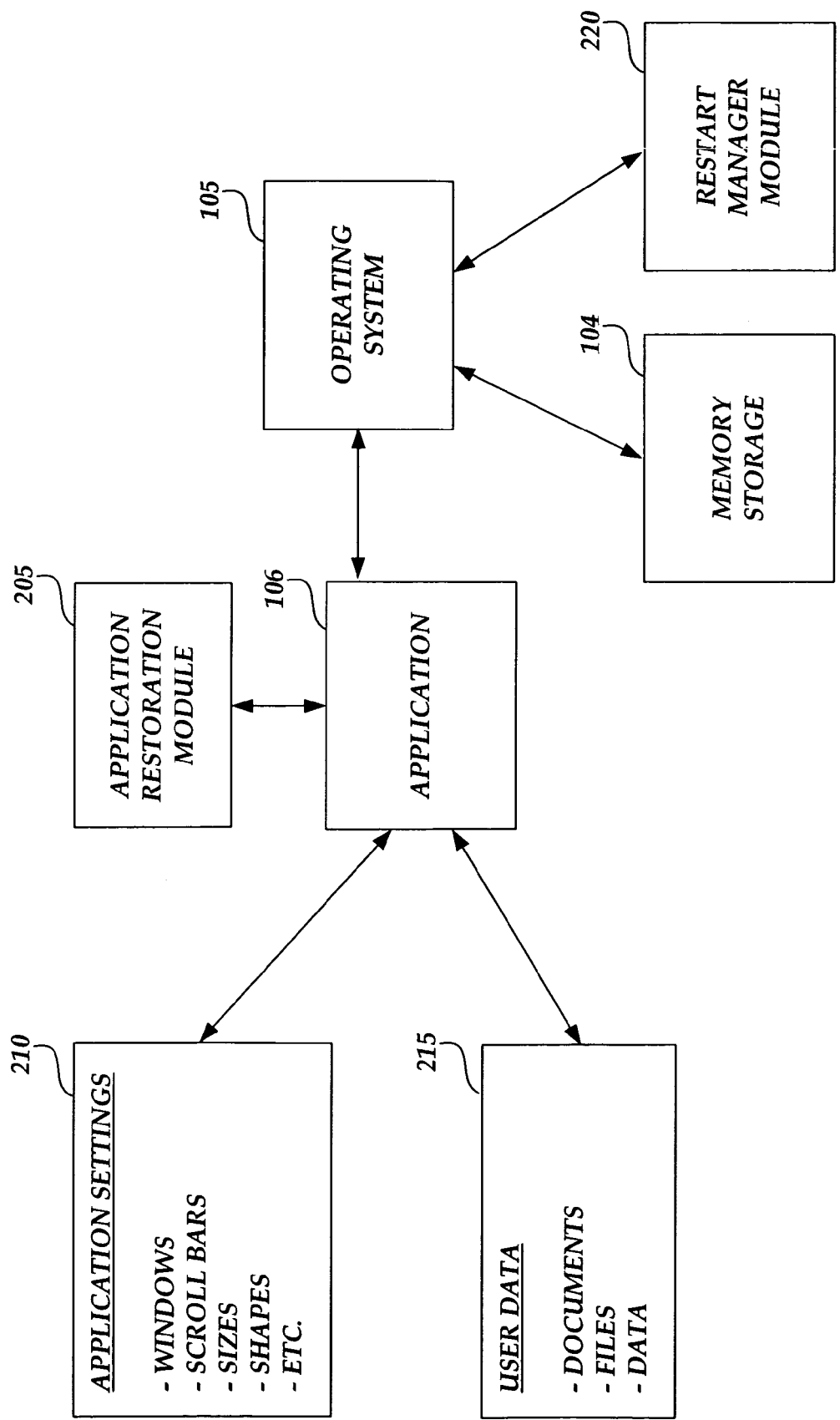
FIG. 2 is a simplified block diagram illustrating a relationship and interaction between a software application, software application components and a computer operating system.

FIG. 2 is a simplified block diagram illustrating a relationship and interaction between a software application, software application components, and an operating system according to embodiments of the present invention. As described herein, according to embodiments of the present invention, application state data and user data are periodically and/or automatically stored to memory so that application state and user data state may be restored after unexpected application shutdown. Referring to FIG. 2, the application 106 is representative of any software application, for example, a word processing application, slide presentation application, spreadsheet application, database application, calendar application, or other application for which application state and associated user data may be stored prior to application shutdown for subsequent restart and restoration of pre-shutdown application state and user data state.

The application settings 210 are representative of one or more application settings associated with a given application prior to unexpected application shutdown. For example, the application settings 210 include the number and placement of application display frames. For example, a word processing application may have a display frame in which a document is displayed. A calendar application may have one or more display frames representing contacts data, electronic mail data, tasks data and the like deployed on a display screen of the user's computer. Additional application settings include the locations, sizes and shapes of deployed application display frames. Additionally, the application settings include any user customization of user interface components, for example, the inclusion, exclusion, and/or placement of individual functionality controls in a user interface component such as a toolbar or dropdown menu. Other application settings state data includes the position of scrollbars and other user interface components in a given application display frame, as well as, other application display frame display properties such as user interface component background colors and the like.

As should be appreciated from the foregoing, individual users often deploy a variety of different software applications simultaneously, and the users often place application components, such as application display frames and displayed user interface components in a variety of customized locations, positions, sizes and orientations. As is well known to those skilled in the art, display frames of a given application, or display frames of a plurality of presently in-use applications may be stacked on a display screen according to the priority of use. For example, if a user presently has deployed a word processing application user interface, an electronic mail application user interface and a spreadsheet application user interface, a presently selected application user interface will be displayed in an application display frame on the surface of the display screen, and other presently deployed application user interface components in their respective application display frames will be deployed in positions underneath the presently selected application user interface and associated display frame.

According to embodiments of the invention, each application 106 presently in use stores to memory data representing the present application settings for each respective application. The automatic storing of application settings may be set by user control to occur at regular intervals, for example, every 10 minutes, every five minutes, every one minute, and the like. Alternatively, a default application settings storage interval may be set, for example, every 10 minutes. At the scheduled storage interval or frequency, each application 106 in use will automatically store to memory the number, shapes, sizes, positions, user interface component settings and customizations, display order and other application settings for displayed application components.

According to an alternative embodiment, a "crash" detection module may be utilized wherein application settings are automatically saved upon the detection of an impending unexpected shutdown of a given application. That is, even though an application settings storage interval may be set to every 10 minutes, if the application crash module detects that an application is shutting down, application settings applicable to each in-use application may be automatically stored immediately before the shutdown is complete.

The user data 215 is representative of user data that is presently deployed via the in-use applications 106. For example, the user data may include word processing documents, spreadsheet application data, slide presentation application slides, drawings and the like, electronic mail and calendar information including electronic mail messages, calendar information, tasks information, and the like. That is, the user data 215 is representative of any user data that is presently deployed via the in-use applications 106 and that is being reviewed, manipulated, edited, or otherwise utilized via the in-use applications 106. As described above for the application settings 215, on a periodic basis, for example, every 10 minutes, user data is automatically stored to memory so that the user data may be restored after an unexpected application shutdown. For example, if the user is presently preparing a memorandum for her employer, on a periodic basis, for example, every 10 minutes, user edits, data entry, or other modifications to the data are automatically stored to a draft version of the document that may be utilized if the application is unexpectedly shut down during a time in which the user has failed to manually save her most recent changes to the data. As described above for the application settings data, in addition to periodic storage of user data, for example, every 10 minutes, user data including electronic mail and calendar data, described below, may be stored automatically upon the detection of an impending application shutdown.

According to embodiments of the present invention, an improved data storage and draft data function is provided for calendar information entered or edited via an electronic calendar application 106, for example, OUTLOOK®, manufactured by MICROSOFT CORPORATION. According to this embodiment, on a periodic basis, calendar information such as appointments, meeting requests, tasks, contacts, and other electronic mail and calendar application data are stored to a draft data folder so that the data may be restored in the event of an unexpected application shutdown. For example, if a user is presently entering an electronic meeting request into her electronic calendar application 106 for establishing a meeting with one or more colleagues, the electronic meeting request being prepared by the user is periodically stored to a draft meeting request folder so that the draft meeting request may be restored after an unexpected application shutdown. Likewise, tasks, notes, contacts data, and other electronic mail and calendar application data being entered or edited are periodically stored to a draft data folder so that those data items may be restored if an unexpected application shutdown occurs during entry and/or edit of any of those electronic mail and calendar application data items.

Referring still to FIG. 2, the application restoration module 205 includes sufficient computer executable instructions for directing the restoration of stored application settings and user data after an unexpected (intended or unintended) application shutdown. According to embodiments of the present invention, the application restoration module 205 is representative of software application instructions integrated with each application 106 for directing the periodic and/or automatic storage of application settings state data and user data. Alternatively, the application restoration module 205 may operate as an independent software application that calls each in-use application 106 from time to time or upon an impending application shutdown to direct the automatic storage of application settings state data and user data.

According to embodiments of the present invention, application restart may be performed independently of the restart of any other application in use including the operating system 105. That is, a given application 106, for example, a word processing application, may experience an unexpected shutdown even though other applications in use, including the operating system 105, may continue running under normal operating conditions. Alternatively, the in-use applications 106 may be shut down and restarted in conjunction with the operating system 105, particularly when a shutdown of the associated computer 100 occurs, which causes a shutdown of all in-use applications, or when the shutdown of a given application 106 is directed via the operation system 105.

A restart manager module 220 may be utilized in association with the operating system 105 to direct the automatic storage of application settings state data and user data of a given application 106 when a shutdown of one or more applications 106 is scheduled to occur. For example, if the computer system administrator of a given organization desires to load a software patch (update or other modification) to one or more applications 106, the restart manager module 220 may be utilized by the system administrator to call each in-use application 106 and direct each in-use application 106 to store application settings 210 and user data 215 prior to a scheduled application shutdown. For example, a user may be presently using one or more applications 106 for entering, editing or otherwise manipulating various user data. While the user is away from her computer, a system administrator of her organization may desire to load a software update or patch to the applications 106 in use by the user.

As is appreciated by those skilled in the art, often after the upload of a software patch or other update or modification to a given application 106, a shutdown and restart of the application 106 is required to properly integrate the software patch or other update to the subject application. If the shutdown and restart occurs while the user is away from her computer, but while the user has presently deployed software applications and user data, application state and user data may be lost because of the shutdown and restart. According to embodiments of the present invention, the restart manager module 220 may be utilized by the system administrator to direct the in-use applications 106 to automatically store application settings state and user data prior to the shutdown and restart even though the time for a periodic storage of application settings state data and user data has not elapsed, for example, the elapse of a 10-minute interval between automatic data storage cycles.

Referring still to FIG. 2, the memory storage 104 is representative of system memory to which application settings state data and user data may be stored, as described herein. As should be appreciated, the memory storage 104 is representative of the system registry of the computer 100, or any other suitable local or remote storage medium which may be used for storing application settings state data and user data described herein.

Figure 3:
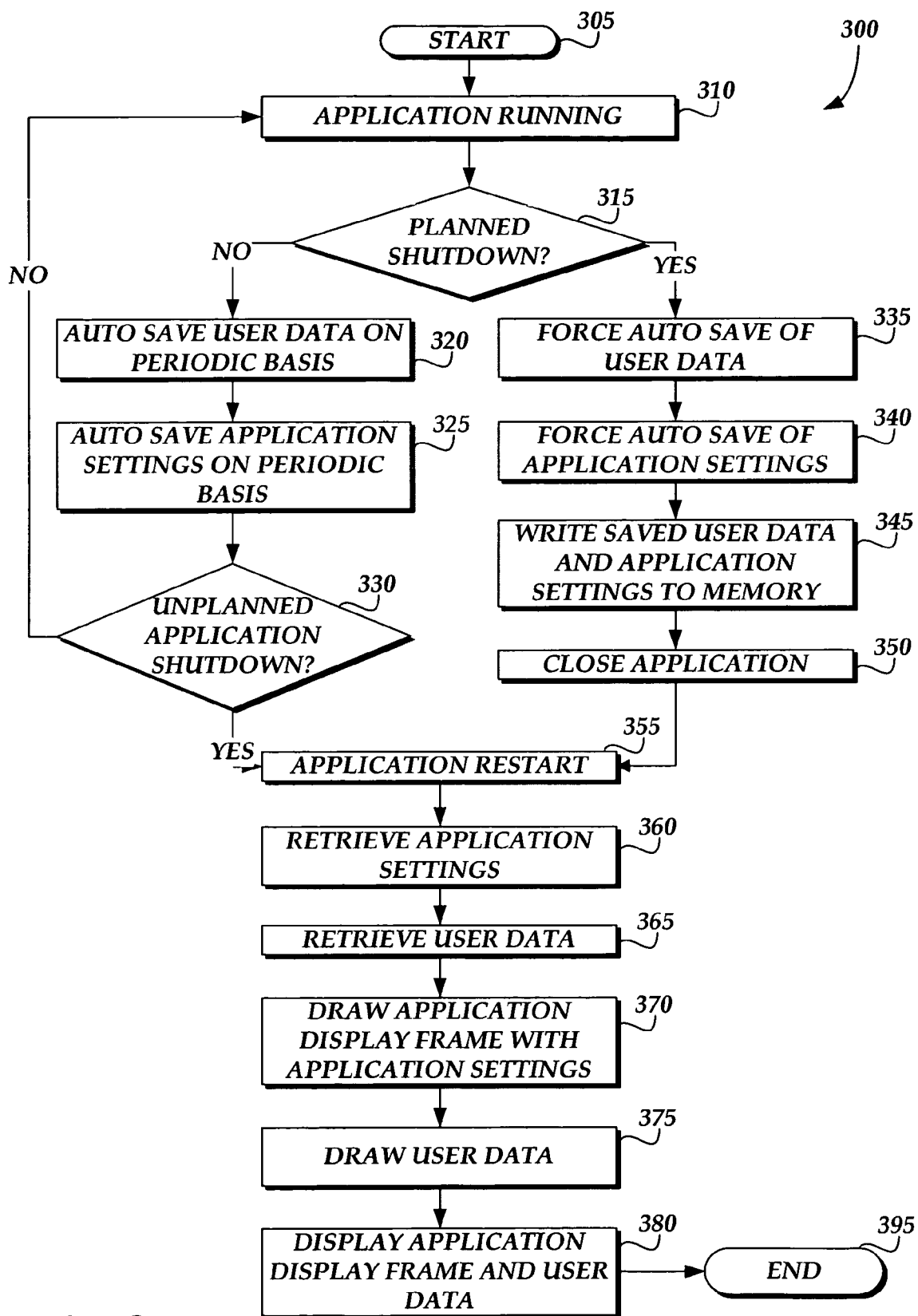
FIG. 3 is a logical flow diagram illustrating the storing of application state data and user data prior to application shutdown and illustrating the restarting of an application after an intended or unintended shutdown.

Having described an exemplary operating environment for embodiments of the present invention with reference to FIGS. 1 and 2 above, FIG. 3 is a logical flow diagram illustrating the storing of application state data and user data prior to application shutdown and illustrating the restarting of an application after an intended or unintended shutdown. For purposes of illustration, consider that an example user is operating one or more applications 106 and that the user has placed display frames of the in-use applications 106 at various locations, orientations and sizes, and that the user has further deployed one or more user data items, for example, word processing documents, spreadsheet documents, slide presentation documents, electronic mail and calendar data, and the like for entering and/or editing the user's data.

The logical flow 300 begins at start block 305 and proceeds to application run block 310 in which the user is presently running and utilizing one or more applications 106, as described above. At decision operation 315, a determination is made as to whether operation of a given application is to be terminated because of a planned application shutdown and restart. As described above, if the applications 106 and/or operating system 105 are to be shutdown and restarted under planned conditions owing to the upload of a software application patch to one of the applications 106 and/or operating system 105 or owing to some other planned shutdown, the restart manager module 220 may notify the in-use applications 106 and the operating system 105 that a shutdown and restart will occur.

If a planned shutdown is to occur, the logical flow proceeds to automatic save operation 335, and the restart manager module 220 directs each in-use application 106 to automatically save the present state of any user data 215, as described above. For example, if the user is presently editing a word processing application, a spreadsheet application, or is entering and editing electronic mail and calendar application data, the restart manager 220 will direct the associated applications 106 to automatically store the user data at its present state so that the data may be restored to its current state after the applications have been restarted. In addition, as described above, if data being entered and/or edited by the user includes electronic calendar data including meeting requests, contacts information, appointments information, tasks or notes information, the associated electronic calendar application 106 will automatically save the current state of that data to an appropriate storage medium 104, as described above.

At application settings save operation 340, the restart manager module 220 directs each in-use application 106 and/or the operating system 105 to automatically store the current state of the application settings 210, as described above. For example, the current state of displayed user interfaces, display frames, or other application components, including the shapes, sizes, locations and orientations of displayed user interface components and display frames, and including the states of user interface components, for example, toolbars, buttons, controls, scrollbars and the like are automatically stored. At save operation 345, the user data and application settings state data are stored to memory 104. At application close operation 350, the in-use applications 106 and/or operating system 105 are shut down.

Referring back to decision operation 315, if a planned shutdown of in-use applications 106 and/or the operating system 105 is not to occur, the routine proceeds to automatic save operation 320, and user data 215 is automatically stored on a periodic basis, for example, every 10 minutes, as described above with reference to FIG. 2. At automatic save operation 325, application settings state data 210 for any in-use application 106 and/or the operating system 105 are automatically stored on a periodic basis, for example, every 10 minutes, as described above with reference to FIG. 2.

As described above, the intervals between automatic data storage for both user data and application settings state data may be modified by user input, or the intervals between automatic data storage may be set by default. Alternatively, the automatic storage of application settings data and the automatic storage of user data may be performed independently of each other. For example, application settings state data may be stored every 5 minutes, and user data may be stored every 10 minutes. For another example, at automatic save operation 320, a determination may be made as to whether any changes to user data have occurred since the last automatic saving of user data. If no changes have occurred to the user data, then no automatic saving of user data must be accomplished. On the other hand, even if no changes have been made to the user data since the last automatic saving cycle, changes may have nonetheless occurred to the application settings state, for example, the user may have moved a display frame from one location on the display screen to another. In such a case, the automatic saving of application settings state data will be required at operation 325. As described above with reference to FIG. 2, automatic saving of user data and application settings state data may also occur outside the normal automatic saving intervals or frequencies, and may occur just before an application shutdown if an application shutdown is detected by the respective applications 106 and/or operating system 105.

At decision operation 330, a determination is made as to whether operation of a given application is being terminated because of an unplanned application shutdown. If no shutdown of the in-use applications 106 and/or operating system 105 occurs, the routine proceeds back to application run operation 310 and proceeds as described above. If an unplanned application shutdown occurs at decision operation 330, the routine proceeds to application restart operation 335. As should be appreciated, the application restart operation 335 also proceeds from the planned application closing operation 350 described above for planned application shutdowns.

At application restart operation 335, the in-use applications 106 and/or the operating system 105 are automatically restarted after a previous shutdown, as described above. At retrieve settings operation 360, the application settings state data stored for the in-use applications 106 and/or the operating system 105 are retrieved from memory storage 104 by the application restoration module 205 for each in-use application 106. As should be appreciated, if the application shutdown was for an individual application 106, the application restoration module 205 may be automatically invoked upon restart of the application 106. Alternatively, the application restoration module 205 may direct the restart of each respective in-use application 106 at the direction of the restart manager module 220, particularly in the case of planned application shutdowns and restarts, as described above. At user data retrieval operation 365, the user data stored for each in-use application 106 is retrieved from memory storage 104.

At operation 370, the in-use applications 106 and/or operating system 105 are restarted, and the user interface components, for example, application display frames, user interface components, scrollbar settings and the like are automatically drawn for display on the user's computer display screen according to the stored application settings state data. That is, each display frame is redrawn to its previous location, to its previous size, and is drawn to contain user interface components that were displayed prior to the shutdown in accordance with the application settings state data that were stored prior to shutdown.

At operation 375, user data is drawn for display according to the user data that was saved prior to application shutdown. For example, if the user was editing a word processing document, and page 5 of the word processing document was displayed with an edit insertion point deployed between two particular words at the time the user data was saved prior to application shutdown, then the document will be drawn to include the particular page and editing insertion point according to the last saved user data prior to application shutdown.

At display operation 380, the application display frames, user interfaces, and user data are displayed on the user's display screen so that the user experience is restored to a point equaling the last stored application settings state data and user data stored prior to application shutdown.

According to an alternative embodiment, application settings state data and user data may be stored by a user action. For example, if the user has a number of applications in use with display frames organized according to the user's desire, and the user is currently editing a number of user data items, for example, word processing documents, spreadsheet documents, slide presentation documents, and a variety of electronic mail and calendar data, the user may desire to manually force the saving of application settings state data and user data so that the user may manually shut down her computer and in-use applications while the user is away, for example, while the user is on a vacation.

According to this embodiment, a user may selectively save current application settings state data and present user data, followed by a manual shutdown of the in-use applications 106 and/or operating system 105. When the user subsequently desires to restart her computer, the user may selectively return the applications 106 and the user data to the states of the applications 106 and the user data manually stored by the user prior to shutdown. Thus, the user may efficiently and automatically return to application settings states and displayed user data states at which the applications and user data were displayed prior to the user' intentional shutdown. According to one embodiment, the user may perform the planned (intended) shutdown and data saving operations via the restart manager module 220. The routine 300 ends at operation 395.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of restoring application state after application shutdown, the method comprising:

storing application settings data, the application settings data representing an application settings state of an application operating on a computing device, the application settings state including data that represents a position of a displayed user interface component of the application and a size of the displayed user interface component;

automatically determining, when the application is restarted at the computer device, whether the application experienced an unexpected shutdown, an unexpected shutdown being a shutdown of the application occurring under circumstances in which a user of the application did not expect the application to shut down; and in response to determining that the application experience an unexpected shutdown, automatically retrieving the application setting data at the computing device and automatically restarting the application on the computer device to the application settings state represented by the application settings data.

2. The method of claim 1,
wherein storing the application settings data includes storing data representing any displayed application user interface components, including data representing any displayed sub-components of the any displayed application user interface components; and
wherein restarting the application to the application settings state includes deploying the any displayed user interface components after restarting the application.

3. The method of claim 1, wherein storing the application settings data includes automatically storing the application settings data at a periodic frequency during operation of the application.

4. The method of claim 1,
wherein the method further comprises determining, at the computing device, whether a scheduled shutdown of the application is to occur; and
wherein storing the application settings includes storing the application settings data in response to determining that a scheduled shutdown of the application is to occur, the scheduled shutdown of the application being an unexpected shutdown of the application.

5. The method of claim 4, further comprising prior to determining whether the application experienced an unexpected shutdown, performing, at the computing device, the scheduled shutdown of the application.

6. The method of claim 5, wherein performing the scheduled shutdown comprises performing the scheduled shutdown when a system administrator uses a restart manager module to shut down the application.

7. The method of claim 1, further comprising storing a set of user data, the set of user data containing all user data deployed via the application prior to an unexpected shutdown of the application.

8. The method of claim 7, wherein storing the set of user data includes storing the set of user data at a periodic frequency during operation of the application.

9. The method of claim 7,
wherein the method further comprises determining, at the computing device, whether a scheduled shutdown of the application is to occur, the scheduled shutdown being an unexpected shutdown; and
wherein storing the set of user data includes storing the set of user data in response to determining that the scheduled shutdown of the application is to occur.

10. The method of claim 7, wherein the method further comprises after restarting the application, deploying via the application, the set of user data.

11. The method of claim 10, prior to deploying the set of user data, retrieving the set of user data.

12. The method of claim 7, wherein storing the set of user data includes storing electronic calendar data to an electronic calendar data storage site.

13. A computer storage medium containing computer executable instructions which, when executed by a computer, cause the computer to perform a method of restoring application state after application shutdown, the method comprising:
automatically storm application settings data, the application settings data representing an application settings state of an application, the application settings state including data that represents a position of a displayed user interface component of the application and a size of the displayed user interface component;
storing a set of user data, the set of user data containing any user data displayed via the application;
automatically determining whether the application experienced an unexpected shutdown, an unexpected shutdown being a shutdown of the application occurring under circumstances in which a user of the application did not expect the application to shut down; and
in response to determining that the application experienced an unexpected shutdown:
automatically retrieving the application settings data;
automatically retrieving the set of user data;
automatically restarting the application to an application settings state according to the application settings data; and
automatically displaying via the application, the user data contained in the set of user data.

14. The computer storage medium of claim 13,
wherein automatically storing the application settings data includes automatically storing data representing any displayed application user interface components, including data representing a position, a size and any displayed sub-components of the any displayed application user interface components; and
wherein automatically restarting the application includes deploying the any displayed user interface components after restarting the application.

15. The computer storage medium of claim 13, wherein automatically storing the application settings data includes automatically storing the application settings data at a periodic frequency during operation of the application.

16. The computer storage medium of claim 13,
wherein the method further comprises automatically determining whether an unexpected shutdown of the application is to occur; and
wherein automatically storing the application settings data includes automatically storing the application settings data in response to determining that an unexpected shutdown of the application is to occur.

17. The computer storage medium of claim 13, wherein automatically storing the set of user data includes automatically storing electronic calendar data to an electronic calendar data storage site.

18. A computer storage medium containing computer executable instructions which when, executed by a computer, cause the computer to perform a method of restoring application state after application shutdown, the method comprising:
automatically storing applications settings data to an electronic calendar data storage site, the application settings data representing an application settings state of an electronic calendaring application operating on the computer, the application settings data including data that represents:
a position of a first displayed user interface component of the electronic calendar application, and
a size of the first displayed user interface component, and
automatically storing user data to the electronic calendar data storage site, the user data being data deployed via the electronic calendar application within the first displayed user interface component;
after storing the application settings data and the deployed user data, performing a scheduled shutdown of the electronic calendar application, the scheduled shutdown being scheduled by a system administrator, the scheduled shutdown being an unexpected shutdown, wherein the unexpected shutdown is a shutdown of the electronic calendaring application occurring under circumstances in which a user of the electronic calendaring application did not expect the electronic calendaring application to shut down;

after performing the scheduled shutdown of the electronic calendar application, loading a software patch that modifies the electronic calendar application;

after loading the software patch, automatically determining whether the electronic calendar application has experienced an unexpected shutdown;

in response to determining that the electronic calendar application has experienced an unexpected shutdown;

retrieving the application settings data;

in response to retrieving the application settings data, restarting the electronic calendar application to the application settings state represented by the application settings data;

retrieving the user data from the electronic calendar data storage site; and displaying, via the electronic calendar application, the user data in a second user interface component at the position of the first displayed user interface component, the second user interface component having the size of the first displayed user interface component.

19. The computer storage medium of claim 18, wherein the method further comprises automatically determining that the scheduled shutdown is to occur; and wherein automatically storing the set of user data includes automatically storing the set of user data to the electronic calendar data storage site in response to determining that the scheduled shutdown is to occur.

20. The computer storage medium of claim 18, wherein automatically storing the set of user data includes automatically storing the set of user data to the electronic calendar data storage site at a periodic frequency during operation of the electronic calendar application.

* * * * *